(12) United States Patent
Xu et al.

(10) Patent No.: US 10,334,231 B2
(45) Date of Patent: Jun. 25, 2019

(54) DISPLAY METHOD AND SYSTEM FOR CONVERTING TWO-DIMENSIONAL IMAGE INTO MULTI-VIEWPOINT IMAGE

(71) Applicant: SHENZHEN SKYWORTH-RGB ELECTRONIC CO., LTD, Shenzhen (CN)

(72) Inventors: Yaoling Xu, Shenzhen (CN); Zhilong Hou, Shenzhen (CN); Xiaofei Jiang, Shenzhen (CN)

(73) Assignee: Shenzhen Skyworth-RGB Electronic Co., Ltd, Shenzhen (CN)

( * ) Notice: Subject to any disclaimer, the term of this patent is extended or adjusted under 35 U.S.C. 154(b) by 0 days.

(21) Appl. No.: 15/759,714

(22) PCT Filed: Jun. 20, 2016

(86) PCT No.: PCT/CN2016/086466
§ 371 (c)(1),
(2) Date: Mar. 13, 2018

(87) PCT Pub. No.: WO2017/156905
PCT Pub. Date: Sep. 21, 2017

(65) Prior Publication Data
US 2019/0052864 A1 Feb. 14, 2019

(30) Foreign Application Priority Data
Mar. 16, 2016 (CN) .......................... 2016 1 0149174

(51) Int. Cl.
*H04N 13/00* (2018.01)
*H04N 13/261* (2018.01)
(Continued)

(52) U.S. Cl.
CPC ........... *H04N 13/261* (2018.05); *H04N 13/00* (2013.01); *H04N 13/128* (2018.05); *H04N 13/20* (2018.05);
(Continued)

(58) Field of Classification Search
CPC .... H04N 13/00; H04N 7/173; H04N 13/0014; H04N 13/0059; H04N 21/21805;
(Continued)

(56) References Cited

U.S. PATENT DOCUMENTS

| 8,619,082 B1* | 12/2013 | Ciurea ................. H04N 13/232 345/427 |
| 2009/0022393 A1* | 1/2009 | Bar-Zohar .............. G06T 7/593 382/154 |

(Continued)

FOREIGN PATENT DOCUMENTS

| CN | 1641702 A | 7/2005 |
| CN | 101742349 A | 6/2010 |

(Continued)

OTHER PUBLICATIONS

The World Intellectual Property Organization (WIPO) International Search Report for PCT/CN2016/086466 dated Dec. 7, 2016 5 Pages.

*Primary Examiner* — Frank F Huang
(74) *Attorney, Agent, or Firm* — Anova Law Group, PLLC

(57) ABSTRACT

Display method and system for converting 2D image into multi-viewpoint image is disclosed, comprising: acquiring and tagging a target object within a 2D image; calculating a depth value according to a frequency component; generating a layered image before viewing from different preset viewpoints; tagging a viewpoint image; estimating before filling a pixel in a blank area of a virtual viewpoint image, based (Continued)

on a depth value difference of the layered image, generating and saving sequentially a single-viewpoint image output, before detecting and filling a blank area in it; detecting before smoothing a sudden change area; assembling to form a synthesized image, processing and sending to a naked-eye 3D display screen for displaying. It converts a 2D image to a multi-viewpoint image, provides a naked-eye 3D display, reduces image distortion, easy and convenient to use, with a low cost.

10 Claims, 4 Drawing Sheets

(51) Int. Cl.
*H04N 13/20* (2018.01)
*H04N 13/30* (2018.01)
*H04N 13/128* (2018.01)

(52) U.S. Cl.
CPC ..... *H04N 13/30* (2018.05); *H04N 2013/0081* (2013.01)

(58) Field of Classification Search
CPC ........... H04N 21/2343; H04N 21/2365; H04N 21/6547; H04N 21/6587; H04N 21/816; H04N 13/0242; H04N 21/6125
See application file for complete search history.

(56) References Cited

U.S. PATENT DOCUMENTS

| | | | |
|---|---|---|---|
| 2010/0259595 A1* | 10/2010 | Trimeche | H04N 21/21805 348/43 |
| 2012/0321172 A1* | 12/2012 | Jachalsky | G06T 7/593 382/154 |
| 2013/0272582 A1* | 10/2013 | Schlosser | G06K 9/4642 382/107 |
| 2013/0321576 A1 | 12/2013 | MacQ et al. | |

FOREIGN PATENT DOCUMENTS

| | | |
|---|---|---|
| CN | 101902657 A | 12/2010 |
| CN | 104837000 A | 8/2015 |
| KR | 101071911 B1 | 10/2011 |

* cited by examiner virtual viewpoint 1

DISPLAY METHOD AND SYSTEM FOR CONVERTING TWO-DIMENSIONAL IMAGE INTO MULTI-VIEWPOINT IMAGE

CROSS-REFERENCES TO RELATED APPLICATIONS

This application is a national stage application of PCT Patent Application No. PCT/CN 2016/086466, filed on Jun. 20, 2016, which claims priority to Chinese Patent Application No. 201610149174.3, filed on Mar. 16, 2016, the content of all of which is incorporated herein by reference.

FIELD OF THE INVENTION

The present invention relates to the field of 3D display technologies, and more particularly, to a display method and system for converting a two-dimensional image into a multi-viewpoint image.

BACKGROUND

A viewer of a naked-eye 3D TV may experience a 3D display without wearing a pair of glasses. However, in the prior art, it is usually necessary to experience an effect of the 3D display of the naked-eye 3D TV in a plurality of different angles, and the naked-eye 3D TV needs to display a plurality of images having a plurality of viewpoints slightly different. However, in the present art, a technology on a multi-viewpoint is not mature, the multi-viewpoint is achieved generally through converting a content in a two-viewpoint or in a viewpoint+depth-of-view into the multi-viewpoint before making the naked-eye 3D display, or through converting a content in the single-viewpoint (or in a two-dimension) into that in the multi-viewpoint before making the naked-eye 3D display, while the two-viewpoint or the viewpoint+depth-of-view also contains little content. Generally, it is displayed in the naked-eye 3D after converting a content in the single-viewpoint into the multi-viewpoint. And in the prior art, a method of converting a content in the single-viewpoint into the multi-viewpoint comprises a 3D information reconstruction based on a plurality of images, a 3D information reconstruction based on a virtual camera, or a 3D information reconstruction based on a speckle information and more, these methods are complicated, hard to implement, having a plurality of defects including an image crack, a distortion and a jitter.

Therefore, the current technology needs to be improved and developed.

BRIEF SUMMARY OF THE DISCLOSURE

According to the above described defects, the purpose of the present invention is providing a display method and system for converting two-dimensional image into multi-viewpoint image, in order to reduce a plurality of problems in the prior art that the method of converting the content in the single-viewpoint into that in the multi-viewpoint is complicated, hard to implement, having the plurality of defects including an image crack, a distortion and a jitter.

In order to achieve the above mentioned goals, the technical solution of the present invention to solve the technical problems is as follows:

A display method for converting a two-dimensional image into a multi-viewpoint image, comprising:

preprocessing a two-dimensional image to be processed, before acquiring and tagging a target object within the two-dimensional image, then calculating a depth value of the target object according to a frequency component of the target object, and generating a plurality of layered images on a basis of a magnitude of the depth value;

viewing the plurality of layered images from a plurality of different preset viewpoint positions, and tagging a viewpoint image, then adopting a plurality of different interpolation algorithms to estimate a pixel in a blank area of a virtual viewpoint image on a basis of a difference between the depth values of the layered images before filling the blank area, removing a space between two layers of the layered images and forming a virtual viewpoint image, scaling the viewpoint image before generating a single-viewpoint image for output;

saving and numbering the single-viewpoint images sequentially, before detecting a blank area in each of the single-viewpoint images and filling the blank area, detecting and smoothing a sudden change area in each of the single-viewpoint images, before assembling the plurality of single-viewpoint images and forming a synthesized image;

after processing the synthesized image for outputting, converting the synthesized image into a plurality of logic electronic signals and sending to a naked-eye 3D display screen for displaying.

The display method for converting a two-dimensional image into a multi-viewpoint image, wherein preprocessing a two-dimensional image to be processed, before acquiring and tagging a target object within the two-dimensional image, then calculating a depth value of the target object according to a frequency component of the target object, and generating a plurality of layered images on a basis of a magnitude of the depth value, comprising specifically:

sharpening the two-dimensional image to be processed, searching and detecting a boundary and an outline of an object in the two-dimensional image before recognizing the target object, dividing and acquiring the target object in the two-dimensional image, then tagging the target object acquired;

obtaining a gray component of each target object, Fourier transforming the gray component and getting a frequency component of each target object, before calculating the depth value of each target object according to the frequency component;

layering the target object and generating the layered images, based on the depth value of each target object, according to a correspondence between the layer and the depth value, while the space between two layers are a difference between the depth values of the target object.

The display method for converting a two-dimensional image into a multi-viewpoint image, wherein viewing the plurality of layered images from a plurality of different preset viewpoint positions, and tagging a viewpoint image, then adopting different interpolation algorithms to estimate a pixel in a blank area of a virtual viewpoint image on a basis of a difference between the depth values of the layered images before filling the blank area, removing a space between two layers of the layered images and forming a virtual viewpoint image, scaling the viewpoint image before generating a single-viewpoint image for output, comprising specifically:

viewing the layered images through the different preset viewpoint positions, and tagging respectively a position of an actual viewpoint and a position of the virtual viewpoint in the viewpoint images;

acquiring the depth values of the target objects where the tagged virtual viewpoint locates, and based on the difference between the depth values of the target objects, adopting different interpolation algorithms to perform an interpolation calculation, obtaining before filling the pixels of each position of the blank area in the tagged virtual viewpoint according to a calculated result, and removing the space between two layers in the layered image, before forming the virtual viewpoint images;

scaling both the actual viewpoint images and the virtual viewpoint images respectively to a preset scale before generating and outputting a single-viewpoint image accordingly.

The display method for converting a two-dimensional image into a multi-viewpoint image, wherein saving and numbering the single-viewpoint images sequentially, before detecting a blank area in each of the single-viewpoint images and filling the blank area, detecting and smoothing a sudden change area in the single-viewpoint image, before assembling the plurality of single-viewpoint images and forming a synthesized image, comprising specifically:

saving the single-viewpoint images sequentially, and numbering the single-viewpoint images as 1, 2, . . . , N viewpoint, while tagging the actual viewpoints, wherein N is a natural number;

detecting sequentially if other single-viewpoint images except for the actual view-point have any blank areas exist, if they have, then interpolating and filling the pixels, adopting four pixels in a non-blank area around the blank area and adjacent to the blank area, according to a certain proportion of distance;

detecting sequentially if other single-viewpoint images except for the actual viewpoint have any sudden change areas exist, if they have, extracting a plurality of tags for positions of the sudden change areas, and detecting if a same area or an adjacent area of the position in the actual viewpoint image has a same sudden change area exist, if it has, then the sudden change area in the single-viewpoint image checked is normal, otherwise, performing a noise-reduction and smoothing process;

based on an arrangement of a plurality of physical pixels of the naked-eye 3D display screen, staggering the pixels in N of the single-viewpoint images, before assembling the plurality of N of the single-viewpoint images into a synthesized image, corresponding to the physical pixels of the naked-eye 3D display screen one by one.

The display method for converting a two-dimensional image into a multi-viewpoint image, wherein after processing the synthesized image for outputting, converting the synthesized image into a plurality of logic electronic signals and sending to the naked-eye 3D display screen for displaying, comprising specifically:

after performing a process of a frame frequency conversion, a Gamma correction, a signal amplitude adjustment and a color gamut format conversion to the synthesized image, converting the synthesized image processed into a plurality of logic electronic signals, before sending to the naked-eye 3D display screen for displaying.

A display system for converting a two-dimensional image into a multi-viewpoint image, comprising:

an image layering module, applied to preprocessing a two-dimensional image to be processed, acquiring and tagging a target object within the two-dimensional image, calculating a depth value of the target object according to a frequency component of the target object, and generating a plurality of layered images on a basis of a magnitude of the depth value;

a single-viewpoint image output module, applied to viewing the plurality of layered images from a plurality of different preset viewpoint positions, and tagging a viewpoint image, adopting different interpolation algorithms to estimate a pixel in a blank area of a virtual viewpoint image on a basis of a difference between the depth values of the layered images and filling the blank area, removing a space between two layers of the layered images and forming a virtual viewpoint image, scaling the viewpoint image and generating a single-viewpoint image for output;

a synthesized image generating module, applied to saving and numbering the single-viewpoint images sequentially, detecting a blank area in each of the single-viewpoint images and filling the blank area, detecting and smoothing a sudden change area in the single-viewpoint image, and assembling the plurality of single-viewpoint images and generating a synthesized image;

a display module, applied to converting the synthesized image into a plurality of logic electronic signals and sending to the naked-eye 3D display screen for displaying after processing the synthesized image for outputting.

The display system for converting a two-dimensional image into a multi-viewpoint image, wherein the image layering module comprising specifically:

a tagging unit, applied to sharpening the two-dimensional image to be processed, searching and detecting a boundary and an outline of an object in the two-dimensional image and recognizing the target object, dividing and acquiring the target object in the two-dimensional image, tagging the target object acquired;

a depth value calculation unit, applied to obtaining a gray component of each target object, Fourier transforming the gray component and getting a frequency component of each target object, and calculating the depth value of each target object according to the frequency component;

a layering unit, applied to layering the target object and generating the layered images, based on the depth value of each target object, according to a correspondence between the layer and the depth value, while the space between two layers are a difference between the depth values of the target object.

The display system for converting a two-dimensional image into a multi-viewpoint image, wherein the single-viewpoint image output module comprises specifically:

a viewpoint tagging unit, applied to viewing the layered images through the different preset viewpoint positions, and tagging respectively a position of an actual viewpoint and a position of the virtual viewpoint in the viewpoint images;

a virtual viewpoint acquiring unit, applied to acquiring the depth values of the target objects where the tagged virtual viewpoints locate, and based on the difference between the depth values of the target objects, performing an interpolation calculation according to the difference of the depth values of the target object by adopting different interpolation algorithms, obtaining and filling the pixels of each position of the blank area in the tagged virtual viewpoint according to a calculated result, removing the space between two layers in the layered image and forming the virtual viewpoint images;

an image output unit, applied to scaling both the actual viewpoint images and the virtual viewpoint images respectively to a preset scale before generating and outputting a single-viewpoint image accordingly.

The display system for converting a two-dimensional image into a multi-viewpoint image, wherein the synthesized image generating module comprises specifically:

an actual viewpoint tagging unit, applied to saving the single-viewpoint images sequentially, and numbering the single-viewpoint images as 1, 2, . . . , N viewpoint, while tagging the actual viewpoints, wherein N is a natural number;

a pixel interpolation unit, applied to detecting sequentially if other single-viewpoint images except for the actual viewpoint have any blank areas exist, if they have, then interpreting and filling the pixels, adopting four pixels in a non-blank area around the blank area and adjacent to the blank area, according to a certain proportion of distance;

a sudden change area processing unit, applied to detecting sequentially if other single-viewpoint images except for the actual viewpoint have any sudden change areas exist, if they have, extracting the tags for positions of the sudden change areas, and detecting if the same area or the adjacent area in the actual viewpoint image according to the same tags for positions has a same sudden change area exist, if it has, then the sudden change area in the single-viewpoint image checked is normal, otherwise, performing a noise-reduction and smoothing process;

a synthesized image generating unit, applied to staggering the pixels in N of the single-viewpoint images, based on an arrangement of the pixels of the naked-eye 3D display screen, and assembling the plurality of N of the single-viewpoint images into a synthesized image, corresponding to the physical pixels of the naked-eye 3D display screen one by one.

The display system for converting a two-dimensional image into a multi-viewpoint image, wherein the display module comprises specifically:

an image process and display unit, applied to performing a process of a frame frequency conversion, a Gamma correction, a signal amplitude adjustment and a gamut format conversion to the synthesized image, converting the synthesized image processed into a plurality of logic electronic signals, and sending to the naked-eye 3D display screen for displaying.

The present invention provides a display method and system for converting a two-dimensional image into a multi-viewpoint image, by preprocessing the two-dimensional image, before acquiring and tagging the target object, estimating the depth values according to the frequency component of the target object, and layering the target object according to the depth values, before forming a virtual image space for an object layering, and tagging the virtual viewpoint image areas, forming a single-viewpoint image for output after filling using different interpolation algorithms, according to the difference of the depth values of the layered image, followed by smoothing each viewpoint image, and generating the synthesized image with multi-viewpoints, and performing an output process before sending to the naked-eye 3D display screen for displaying. The present invention may convert a two-dimensional image to a multi-viewpoint image, provide a naked-eye 3D display, and reduce image distortion. The invention is easy and convenient to use with a low cost.

DETAILED DESCRIPTION OF EMBODIMENTS

The present invention provides a display method and system for converting a two-dimensional image into a multi-viewpoint image, in order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
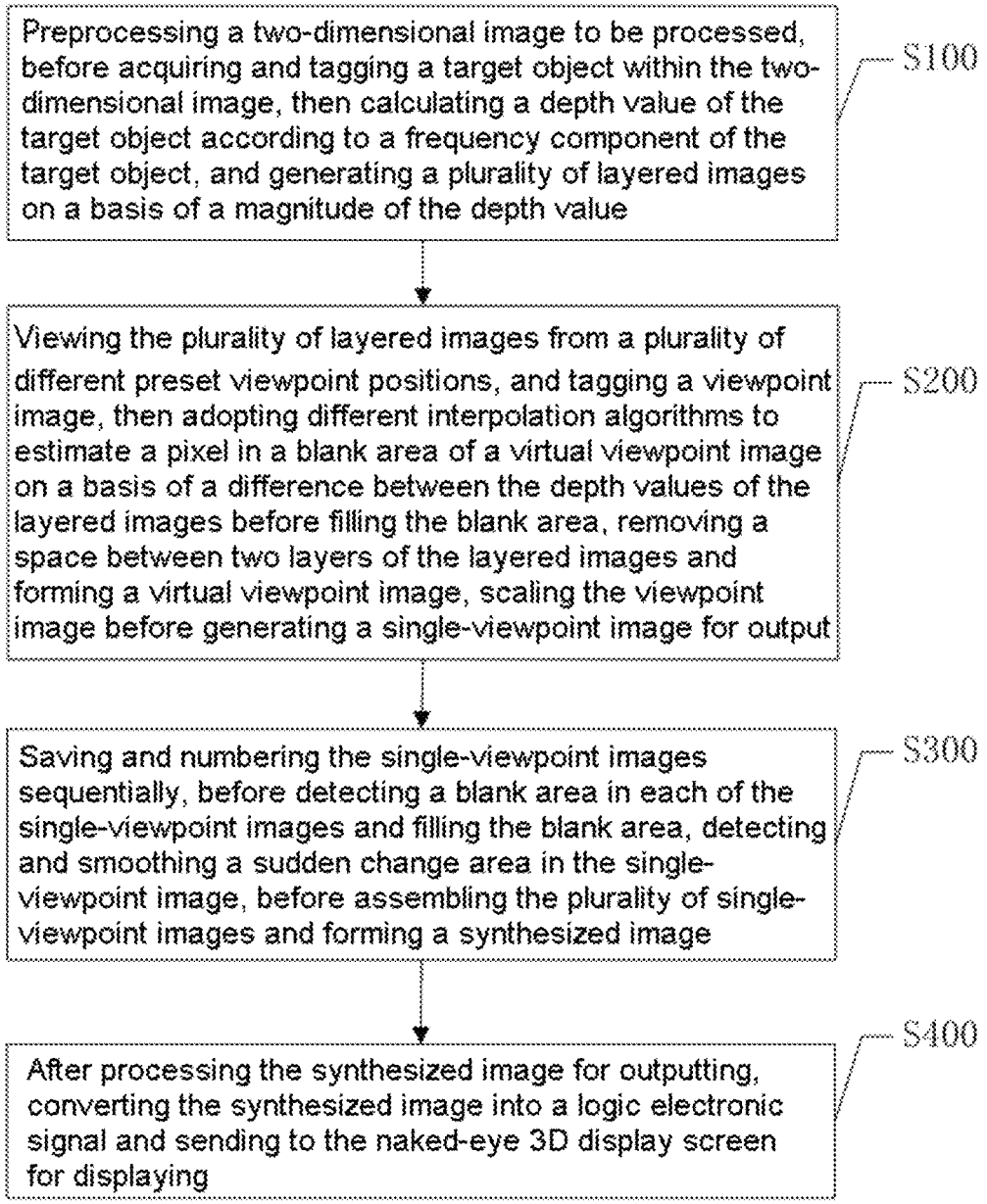
FIG. 1 illustrates a flow chart on a preferred embodiment of the display method for converting a two-dimensional image into a multi-viewpoint image.

The present invention provides a flow chart on a preferred embodiment of the display method for converting a two-dimensional image into a multi-viewpoint image, as shown in FIG. 1, the method comprises:

step S100, preprocessing a two-dimensional image to be processed, before acquiring and tagging a target object within the two-dimensional image, then calculating a depth value of the target object according to a frequency component of the target object, and generating a plurality of layered images on a basis of a magnitude of the depth value.

Specifically, receiving a input two-dimensional image (called an original two-dimensional image), sharpening and other processing the two-dimensional image, layering and acquiring a target object in the two-dimensional image before tagging as OBJi; followed by estimating the depth value DP_OBJi according to a frequency component of the target object OBJi; and finally performing an object layering according to a magnitude of the depth value DP_OBJi, placing each of the target object OBJi into different layers and forming a virtual layered space.

In a further implementation, the step S100 comprises specifically:

step S101, sharpening the two-dimensional image to be processed, searching and detecting a boundary and an outline of an object in the two-dimensional image before recognizing the target object, dividing and acquiring the target object in the two-dimensional image, then tagging the target object acquired;

step S102, obtaining a gray component of each target object, Fourier transforming the gray component and getting a frequency component of each target object, before calculating the depth value of each target object according to the frequency component;

step S103, layering the target object and generating the layered images, based on the depth value of each target object, according to a correspondence between the layer and the depth value, while the space between two layers are a difference between the depth values of the target object.

In a specific implementation, a target object is first acquired. After receiving the original two-dimensional image, it sharpens the original two-dimensional image, makes both an edge and an outline of the target object in the image significant, then through searching and detecting both the edge and the outline of the target object in the image, it recognizes the target object, and further segments the target object in the image before acquiring the target object. Followed by tagging the target object acquired as OBJi, i takes 1, 2, . . . ; OBJi comprises an image content, a position information and more of the target object.

Then, a deep estimation is executed. First, it executes a gray process to each of the target objects OBJi (i takes 1, 2, . . . ;), and acquires a gray component of each target object, followed by making a Fourier transform to the gray component before getting a frequency component of each target object, then estimates the depth value DP_OBJi of each target object according to the frequency component. If the frequency component of a target object OBJi is OBJi_f, then a calculation formula for the depth value is DP_OBJi= (OBJi_f/frq_s−1)*DP_U+DP_S, wherein, frq_s is a preset reference frequency, DP_S is a preset reference depth value. It may estimate the depth value of each target object according to the calculation formula for the depth value.

Finally, an object layering is executed. Layering the target object is executed according to the depth value DP_OBJi, the one with a large value of the DP_OBJi is placed in an outer layer, while the one with a small value of the DP_OBJi is placed in an inner layer, a correspondence is made between the layer and the depth value, while the space between two layers are a difference between the depth values of the target object; through the object layering, a virtual object layering space is formed, which makes up a distribution of the target object in a three dimensional space.

Figure 2A:
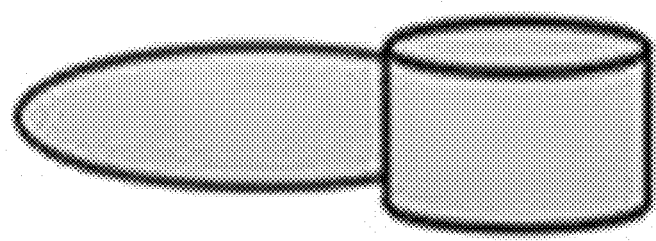
FIG. 2a illustrates a schematic diagram on an original two dimensional image in a preferred embodiment of the display method for converting a two-dimensional image into a multi-viewpoint image.
Figure 2B:
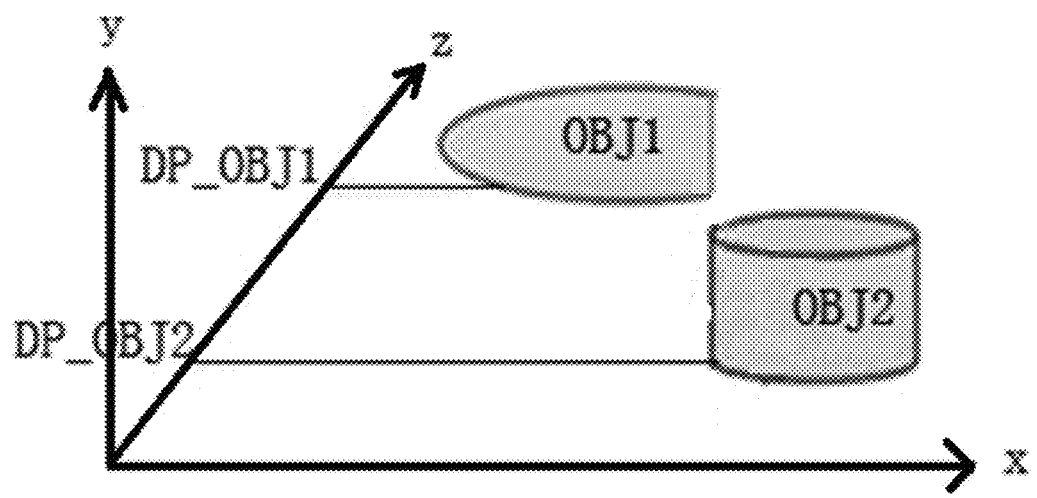
FIG. 2b illustrates a schematic diagram on a layered space after processing the original two dimensional image illustrated in FIG. 2a in a preferred embodiment of the display method for converting a two-dimensional image into a multi-viewpoint image.

For example, as shown in FIG. 2a and FIG. 2b: in the FIG. 2a, an actual viewpoint is an original two dimensional image; after acquiring the objects, two target objects OBJ1 and OBJ2 are acquired, and after a deep estimation, two depth values of DP_OBJ1 and DP_OBJ2 are acquired respectively, then a distribution after an object layering process is shown as FIG. 2b: OBJ1 and OBJ2 are shown in the FIG. 2a and the FIG. 2b, wherein a direction of Z is a direction of depth.

Step S200, viewing the plurality of layered images from a plurality of different preset viewpoint positions, and tagging a viewpoint image, then adopting different interpolation algorithms to estimate a pixel in a blank area of a virtual viewpoint image on a basis of a difference between the depth values of the layered images before filling the blank area, removing a space between two layers of the layered images and forming a virtual viewpoint image, scaling the viewpoint image before generating a single-viewpoint image for output;

In a real implement, after receiving the layered images, it views the layered images from a plurality of different viewpoint positions, tags a viewpoint image, and tags an area of a virtual viewpoint image; then according to a difference between the depth values of the layered images, it estimates a plurality of pixels of the blank area in the virtual viewpoint image by adopting different interpolation algorithms, and fills the blank area, followed by removing a space between two layers and forming a two dimensional image, that is, forming a virtual viewpoint image; then it scales the viewpoint image before generating a single-viewpoint image for output.

Specifically, the step S200 comprises:

step S201, viewing the layered images through the different preset viewpoint positions, and tagging respectively a position of an actual viewpoint and a position of the virtual viewpoint in the viewpoint images;

step S202, acquiring the depth values of the target objects where the tagged virtual viewpoint locates, and based on the difference between the depth values of the target objects, performing an interpolation calculation according to the difference of the depth values of the target object by adopting different interpolation algorithms, obtaining before filling the pixels of each position of the blank area in the tagged virtual viewpoint according to a calculated result, and removing the space between two layers in the layered image, before forming the virtual viewpoint images;

step S203: scaling both the actual viewpoint images and the virtual viewpoint images respectively to a preset scale before generating and outputting a single-viewpoint image accordingly.

In a real implement, first it tags the viewpoint. After receiving the layered images, it sets different viewpoint positions to view the layered images, and tags the viewpoint image; when viewing the layered images at a specific viewpoint position, and a viewpoint image formed is just the original two dimensional image, then this specific position is an actual viewpoint position, and the original two dimensional image is an actual single-viewpoint image; moving to the virtual viewpoint position on a same level of the actual viewpoint position, and viewing the layered image, it may view a plurality of different parts of the target object in the layered images, while acquiring an existing part of the target object, and extending a border of a non-existing part, a virtual viewpoint is tagged.

Figure 3A:
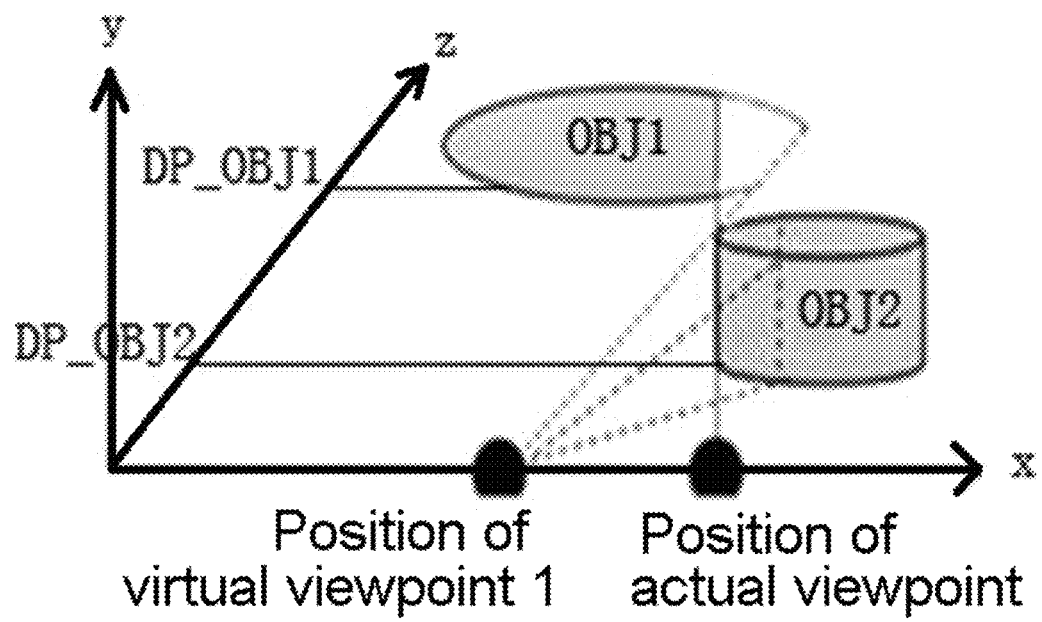
FIG. 3a illustrates a schematic diagram on viewpoints tagging in a preferred embodiment of the display method for converting a two-dimensional image into a multi-viewpoint image.
Figure 3B:
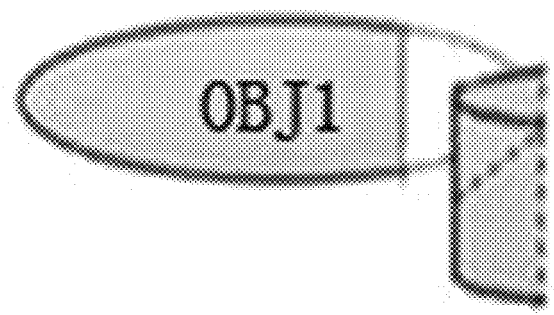
FIG. 3b illustrates a schematic diagram on the virtual viewpoints in a preferred embodiment of the display method for converting a two-dimensional image into a multi-viewpoint image.

For example, as shown in FIG. 3a, FIG. 3b: in the FIG. 3a, when viewing the layered image at the actual viewpoint position, the viewpoint image formed is just an original single-viewpoint image, then the original single-viewpoint image is an actual viewpoint image, when viewing the layered images at a position of the virtual viewpoint 1, it may view an existing part of the OBJ2 only (such as a left part of a dash line of the OBJ2), then the left part of the OBJ2 is obtained; when it is able to view a part that did not exist (a white part of the OBJ1), except for a whole of the existing part of the OBJ1, then the whole existing part of the OBJ1 is obtained, and it is extended to a non-existing part following the border, thus the virtual viewpoint 1 is tagged, the virtual viewpoint 1 tagged is shown in FIG. 3b.

Next, a viewpoint interpolation is performed. If it is an actual viewpoint image, then it will enter a next process directly without the viewpoint interpolation; if it is a tagged virtual viewpoint, then according to a difference between the depth values, different interpolation algorithms are adopted to estimate the pixels of the blank area in the virtual viewpoint images, and the blank area is filled, before a virtual viewpoint is formed. A process of the viewpoint interpolation is:

first, making a judgment to the depth values of the objects in each layer of the tagged virtual viewpoints:

1) if a depth value of an object OBJi, a DP_STD is a preset threshold, then a four-point-average algorithm is adopted for the interpolation, that is: if four pixels around and adjacent to the pixel to be interpolated P(m, n) are respectively P(m, n−1), P(m, n+1), P(m−1, n), P(m+1, n), then an interpolated pixel is P(m, n)=[P(m, n−1)+P(m, n+1)+P(m−1, n)+P(m+1, n)]/4, wherein, m, n is an array mark; if a certain pixel in the adjacent four pixels does not exist, then a pixel in a next line or a next row is applied for a substitution, for example, if P(m, n+1) and P(m+1, n) do not exist, then the interpolated pixel is P(m, n)=[P(m, n−1)+P(m, n−1)+P(m−1, n)+P(m−1, n)]/4.

2) if the depth value of an object OBJi, then it is interpolated according to a change tendency of a plurality of adjacent pixels, such as adopting 8 adjacent pixels for the interpolation: the pixel to be interpolated is P(m, n), and 8 adjacent pixels around it are P(m, n−2), P(m, n−1), P(m, n+1), P(m, n+2), P(m−2, n), P(m−1, n), P(m+1, n) and P(m+2, n); if S(m, n−1)=P(m, n−1)−P(m, n−2), S(m, n+1)= P(m, n+2)−P(m, n+1), S(m−1, n)=P(m−2, n)−P(m−1, n), S(m+1, n)=P(m+2, n)−P(m+1, n), and K1=S(m, n−1)/[S(m, n−1)+S(m, n+1)+S(m−1, n)+S(m+1, n)], K2=S(m, n+1)/[S (m, n−1)+S(m, n+1)+S(m−1, n)+S(m+1, n)], K3=S(m−1, n)/[S(m, n−1)+S(m, n+1)+S(m−1, n)+S(m+1, n)], K4=S(m+ 1, n)/[S(m, n−1)+S(m, n+1)+S(m−1, n)+S(m+1, n)]; then the pixel to be interpolated is P(m, n)=K1*P(m, n−1)+K2*P(m, n+1)+K3*P(m−1, n)+K4*P(m+1, n).

Estimating and filling the pixels of each position of the blank area in the tagged virtual viewpoint through the interpolation algorithm, followed by removing the space between two layers and forming a two-dimensional image, a virtual viewpoint image is then formed.

Finally, a viewpoint scaling is executed. The viewpoint image (including the actual viewpoint image or the virtual viewpoint image) is reduced or enlarged to a certain size, which fits a requirement of a plurality of follow-up processes. For example, a viewpoint image in a pixel matrix of 1920*1080 needs to be reduced to that of 1366*768, or a viewpoint image in a pixel matrix of 1366*768 needs to be enlarged to that of 1920*1080, so as to facilitate any follow-up processes. A single-viewpoint image is formed and output after the viewpoint scaling.

Step S300, saving and numbering the single-viewpoint images sequentially, before detecting a blank area in each of the single-viewpoint images and filling the blank area, detecting and smoothing a sudden change area in the single-viewpoint image, before assembling the plurality of single-viewpoint images and forming a synthesized image.

In a real implement, after receiving the single-viewpoint images, the single-viewpoint images are saved sequentially, and numbered as 1, 2, . . . , N viewpoint, executing a blank area detecting and filling in each of the single-viewpoint images, and a sudden change area detecting and smoothing in each of the single-viewpoint images, before assembling N of the viewpoint images and forming a synthesized image, finishing synthesizing the viewpoints.

Specifically, the step S300 comprises:

step S301, saving the single-viewpoint images sequentially, and numbering the single-viewpoint images as 1, 2, . . . , N viewpoint, while tagging the actual viewpoints, wherein N is a natural number;

step S302, detecting sequentially if other single-viewpoint images except for the actual view-point have any blank areas exist, if they have, then interpolating and filling the pixels, adopting four pixels in a non-blank area around the blank area and adjacent to the blank area, according to a certain proportion of distance;

step S303, detecting sequentially if other single-viewpoint images except for the actual viewpoint have any sudden change areas exist, if they have, extracting a plurality of tags for positions of the sudden change areas, and detecting if a same area or an adjacent area in the actual viewpoint image according to the tags for positions has a same sudden change area exist, if it has, then the sudden change area in the single-viewpoint image checked is normal, otherwise, performing a noise-reduction and smoothing process;

step S304, based on an arrangement of the pixels of the naked-eye 3D display screen, staggering the pixels in N of the single-viewpoint images, before assembling the plurality of N of the single-viewpoint images into a synthesized image, corresponding to the physical pixels of the naked-eye 3D display screen one by one.

In a real implement, a viewpoint fusion includes a viewpoint saving, a blank area filling, an image sudden change area smoothing and a viewpoint synthesizing.

First, the single-viewpoint images are received, and the viewpoints are saved: saving the single-viewpoint images sequentially, and numbering the single-viewpoint images as 1, 2, . . . , N viewpoint, while tagging the actual viewpoints.

Figure 4:
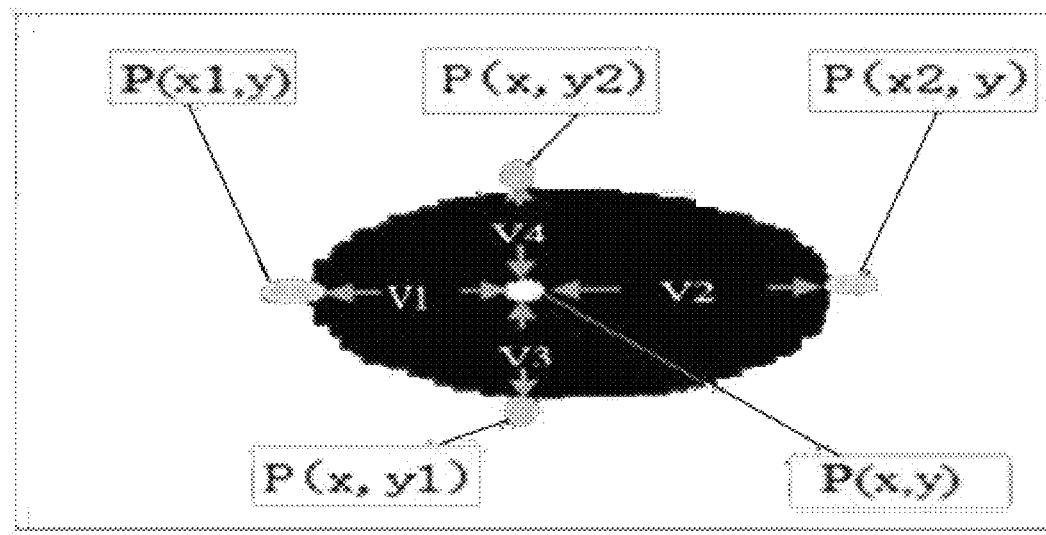
FIG. 4 illustrates a schematic diagram on a relationship between the pixels in a blank area and an adjacent non-blank area of the viewpoint images in a preferred embodiment of the display method for converting a two-dimensional image into a multi-viewpoint image.

Followed by filling the blank areas in the viewpoint images: detecting sequentially if other single-viewpoint images except for the actual view-point have any blank areas (i.e., the areas filling with black pixels) exist, if they have, then interpolating and filling the pixels, adopting four pixels in a non-blank area around the blank area and adjacent to the blank area, according to a certain proportion of distance, that is: a pixel to be filled P(x, y) is in the blank area, and pixels in the non-blank area around the blank area are P(x1, y), P(x2, y), P(x, y1), P(x, y2) respectively, these four pixels are adjacent to the blank area, while their distances from the P(x, y) are V1=|x1−x|, V2=|x2−x|, V3=|y1−y|, V4=|y2−y| respectively, let V=V1+V2+V3+V4, then P(x, y)=P(x1, y)*V1/V+P(x2, y)*V2/V+P(x, y1)*V3/V+P(x, y2)*V4/V; for example, as shown in FIG. 4: a black area is the blank area, P(x, y) is a pixel to be filled, four pixels in the non-blank area around the blank area P(x1, y), P(x2, y), P(x, y1), P(x, y2) are adjacent to the blank area, while the P(x1, y) and P(x2, y) owns a same y coordinate with the pixel P(x, y) to be filled, and their horizontal distances are V1 and V2 respectively, the P(x, y1) and P(x, y2) owns a same x coordinate with the pixel P(x, y) to be filled, and their vertical distances are V3 and V4 respectively; calculate and fill the pixels in each blank area sequentially, so as to remove any existing blanks.

Smoothing the sudden change areas in the viewpoint images is further executed: detecting sequentially if other single-viewpoint images except for the actual viewpoint have any sudden change areas exist, if they have: extracting a position tag PM of the sudden change area, and further detecting if a same area or an adjacent area of the position PM in the actual viewpoint image has a same sudden change exist, if it has, then the sudden change area in the single-viewpoint image detected is normal, otherwise, a noise-reduction and smoothing process is performed, in order to avoid any image sudden changes;

A viewpoint synthesizing is finally executed: based on an arrangement of a plurality of physical pixels of the naked-eye 3D display screen, staggering the pixels in N of the single-viewpoint images, before assembling the plurality of N of the single-viewpoint images into a synthesized image, whose each pixel is corresponding to the physical pixels of the 3D display screen one by one, and the pixels of each single-viewpoint image contained is corresponding to the physical pixels of an according viewpoint area in the 3D display screen one by one.

Step S400, after processing the synthesized image for outputting, converting the synthesized image into a plurality of logic electronic signals and sending to the naked-eye 3D display screen for displaying.

In a real implement, after performing a process of a frame frequency conversion, a Gamma correction, a signal amplitude adjustment and a color gamut format conversion to the synthesized image, the synthesized image is woven into a plurality of logic electronic signals (such as a LVDS signal, a VBO signal, a TTL signal and more), before sending to the naked-eye 3D display screen. The naked-eye 3D display screen receives the synthesized image and achieves the naked-eye 3D display.

From above listed embodiments on the method, it can be seen that, the present invention provides a display method for converting a two-dimensional image into a multi-viewpoint image: performing a plurality of processes including sharpening to the two-dimensional image input, dividing and acquiring a plurality of target objects in the two-dimensional image before tagging as OBJi, further estimating a depth value DP_OBJi of each target object according to the frequency component, and executing the object layering according to a size of the depth value DP_OBJi before forming a virtual object layered image space; followed by viewing the layered image at different viewpoint positions, and tagging a virtual viewpoint image areas, followed by further adopting different interpolation algorithms to estimate a pixel in the blank area of the virtual viewpoint image on a basis of a difference between the depth values of the layered images before filling the blank area, further removing a space between two layers of the layered images and forming a virtual viewpoint image, and scaling the viewpoint image before generating a single-viewpoint image for output; finally saving the single-viewpoint images sequentially, and numbering the single-viewpoint images as 1, 2, . . . , N viewpoint, further performing a sudden change area detection and a smooth process for each viewpoint image, and assembling N of viewpoint images into a synthesized image, followed by further performing a plurality of output processes to the synthesized image including a frame frequency conversion, a color gamut format conversion and more, before weaving the synthesized image into a plurality of logic electric signals and sending to the naked-eye 3D screen, the naked-eye 3D screen receives the signals of the synthesized image, and the naked-eye 3D display is finally achieved. The invention can achieve converting a two-dimensional image to a multi-viewpoint image, provide a naked-eye 3D display, and reduce image distortion. The invention is easy and convenient to use and has a low cost, thus owns a pretty large application value.

Figure 5:
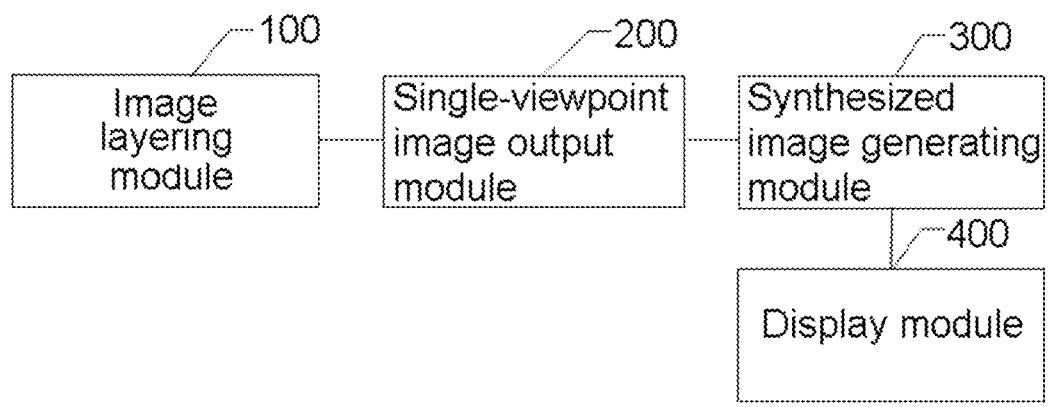
FIG. 5 illustrates a functional block diagram on a preferred embodiment of a display system for converting a two-dimensional image into a multi-viewpoint image.

The present invention further provides a preferred embodiment of a display system for converting a two-dimensional image into a multi-viewpoint image, a functional block diagram is shown as FIG. 5, wherein, the system comprising:

an image layering module 100, applied to preprocessing a two-dimensional image to be processed, acquiring and tagging a target object within the two-dimensional image, calculating a depth value of the target object according to a frequency component of the target object, and generating a plurality of layered images on a basis of a magnitude of the depth value; details have been described in the embodiments on the method listed above.

a single-viewpoint image output module 200, applied to viewing the plurality of layered images from a plurality of different preset viewpoint positions, and tagging a viewpoint image, adopting different interpolation algorithms to estimate a pixel in a blank area of a virtual viewpoint image on a basis of a difference between the depth values of the layered images and filling the blank area, removing a space between two layers of the layered images and forming a virtual viewpoint image, scaling the viewpoint image and generating a single-viewpoint image for output; details have been described in the embodiments on the method listed above.

a synthesized image generating module 300, applied to saving and numbering the single-viewpoint images sequentially, detecting a blank area in each of the single-viewpoint images and filling the blank area, detecting and smoothing a sudden change area in the single-viewpoint image, and assembling the plurality of single-viewpoint images and generating a synthesized image; details have been described in the embodiments on the method listed above.

a display module 400, applied to applied to converting the synthesized image into a plurality of logic electronic signals and sending to the naked-eye 3D display screen for displaying after processing the synthesized image for outputting; details have been described in the embodiments on the method listed above.

The display system for converting a two-dimensional image into a multi-viewpoint image, wherein the image layering module comprising specifically:

a tagging unit, applied to sharpening the two-dimensional image to be processed, searching and detecting a boundary and an outline of an target object in the two-dimensional image and recognizing the target object, dividing and acquiring the target object in the two-dimensional image, tagging the target object acquired; details have been described in the embodiments on the method listed above.

a depth value calculation unit, applied to obtaining a gray component of each target object, Fourier transforming the gray component and getting a frequency component of each target object, and calculating the depth value of each target object according to the frequency component; details have been described in the embodiments on the method listed above.

a layering unit, applied to layering the target object and generating the layered images, based on the depth value of each target object, according to a correspondence between the layer and the depth value, while the space between two layers are a difference between the depth values of the target object details have been described in the embodiments on the method listed above.

The display system for converting a two-dimensional image into a multi-viewpoint image, wherein the single-viewpoint image output module comprising specifically:

a viewpoint tagging unit, applied to viewing the layered images through the different preset viewpoint positions, and tagging respectively a position of an actual viewpoint and a position of the virtual viewpoint in the viewpoint images; details have been described in the embodiments on the method listed above.

a virtual viewpoint acquiring unit, applied to acquiring the depth values of the target objects where the tagged virtual viewpoints locate, and based on the difference between the depth values of the target objects, performing an interpolation calculation by adopting different interpolation algorithms, obtaining and filling the pixels of each position of the blank area in the tagged virtual viewpoint according to a calculated result, removing the space between two layers in the layered image and forming the virtual viewpoint images; details have been described in the embodiments on the method listed above.

an image output unit, applied to scaling both the actual viewpoint images and the virtual viewpoint images respectively to a preset scale before generating and outputting a single-viewpoint image accordingly details have been described in the embodiments on the method listed above.

The display system for converting a two-dimensional image into a multi-viewpoint image, wherein the synthesized image generating module comprising specifically:

an actual viewpoint tagging unit, applied to saving the single-viewpoint images sequentially, and numbering the single-viewpoint images as 1, 2, . . . , N viewpoint, while tagging the actual viewpoints, wherein N is a natural number; details have been described in the embodiments on the method listed above.

a pixel interpolation unit, applied to detecting sequentially if other single-viewpoint images except for the actual viewpoint have any blank areas exist, if they have, then Interpolating and filling the pixels, adopting four pixels in a non-blank area around the blank area and adjacent to the blank area, according to a certain proportion of distance; details have been described in the embodiments on the method listed above.

a sudden change area processing unit, applied to detecting sequentially if other single-viewpoint images except for the actual viewpoint have any sudden change areas exist, if they have, extracting the tags for positions of the sudden change areas, and detecting if the same area or the adjacent area in the actual viewpoint image according to the same tags for positions has a same sudden change area exist, if it has, then the sudden change area in the single-viewpoint image checked is normal, otherwise, performing a noise-reduction and smoothing process; details have been described in the embodiments on the method listed above.

a synthesized image generating unit, applied to staggering the pixels in N of the single-viewpoint images, based on an arrangement of the pixels of the naked-eye 3D display screen, and assembling the plurality of N of the single-viewpoint images into a synthesized image, corresponding to the physical pixels of the naked-eye 3D display screen one by one; details have been described in the embodiments on the method listed above.

The display system for converting a two-dimensional image into a multi-viewpoint image, wherein the display module comprising specifically:

an image process and display unit, applied to performing a process of a frame frequency conversion, a Gamma correction, a signal amplitude adjustment and a color gamut format conversion to the synthesized image, converting the synthesized image processed into a plurality of logic electronic signals, and sending to the naked-eye 3D display screen for displaying; details have been described in the embodiments on the method listed above.

All above, the present invention provides a display method and system for converting a two-dimensional image into a multi-viewpoint image. The method comprises: acquiring and tagging a target object within a two-dimensional image to be processed; calculating, according to a frequency component of the target object, a depth value of the target object; generating, on the basis of the magnitude of the depth value, a layered image; viewing the layered image from different preset viewpoints, tagging a viewpoint image; estimating, on the basis of a depth value difference of the layered image, a pixel in a blank area of a virtual viewpoint image, filling the blank area and generating a single-viewpoint image for output; sequentially saving the single-viewpoint image; detecting a blank area in each of the single-viewpoint images and filling the blank area; detecting a sudden change area and then smoothing the sudden change area; assembling the single-viewpoint images to form a synthesized image; and processing the synthesized image, then sending the processed image to a naked-eye 3D display screen for displaying. The invention can convert a two-dimensional image to a multi-viewpoint image, provide a naked-eye 3D display, and reduce image distortion. The invention is easy and convenient to use and has a low cost.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A display method for converting a two-dimensional image into a multi-viewpoint image, comprising:

preprocessing a two-dimensional image to be processed, before acquiring and tagging a target object within the two-dimensional image, then calculating a depth value of the target object according to a frequency component of the target object, and generating a plurality of layered images on a basis of a magnitude of the depth value;

viewing the plurality of layered images from a plurality of different preset viewpoint positions, and tagging a viewpoint image, then adopting different interpolation algorithms to estimate a pixel in a blank area of a virtual viewpoint image on a basis of a difference between the depth values of the layered images before filling the blank area, removing a space between two layers of the layered images and forming a virtual viewpoint image, scaling the viewpoint image before generating a single-viewpoint image for output;

saving and numbering the single-viewpoint images sequentially, before detecting the blank area in each of the single-viewpoint images and filling the blank area, detecting and smoothing a sudden change area in each of the single-viewpoint images, before assembling the plurality of single-viewpoint images and forming a synthesized image;

after processing the synthesized image for outputting, converting the synthesized image into a plurality of logic electronic signals and sending to a naked-eye 3D display screen for displaying.

2. The display method according to claim 1, wherein preprocessing a two-dimensional image to be processed, before acquiring and tagging a target object within the two-dimensional image, then calculating a depth value of the target object according to a frequency component of the target object, and generating a plurality of layered images on a basis of a magnitude of the depth value, comprising specifically:

sharpening the two-dimensional image to be processed, searching and detecting a boundary and an outline of an target object in the two-dimensional image before recognizing the target object, dividing and acquiring the target object in the two-dimensional image, then tagging the target object acquired;

obtaining a gray component of each target object, Fourier transforming the gray component and getting a frequency component of each target object, before calculating the depth value of each target object according to the frequency component;

layering the target object and generating the layered images, based on the depth value of each target object, according to a correspondence between the layer and the depth value, while the space between two layers are a difference between the depth values of the target object.

3. The display method according to claim 2, wherein viewing the plurality of layered images from a plurality of different preset viewpoint positions, and tagging a viewpoint image, then adopting different interpolation algorithms to estimate a pixel in a blank area of a virtual viewpoint image on a basis of a difference between the depth values of the layered images before filling the blank area, removing a space between two layers of the layered images and forming a virtual viewpoint image, scaling the viewpoint image before generating a single-viewpoint image for output, comprising specifically:

viewing the layered images through the different preset viewpoint positions, and tagging respectively a position of an actual viewpoint and a position of the virtual viewpoint in the viewpoint images;

acquiring the depth values of the target objects where the tagged virtual viewpoint locates, and based on the difference between the depth values of the target objects, adopting different interpolation algorithms to perform an interpolation calculation according to the difference of the depth values of the target object, obtaining before filling the pixels of each position of the blank area in the tagged virtual viewpoint according to a calculated result, and removing the space between two layers in the layered image, before forming the virtual viewpoint images;

scaling both an actual viewpoint image and the virtual viewpoint image respectively to a preset scale before generating and outputting a single-viewpoint image accordingly.

4. The display method according to claim 3, wherein saving and numbering the single-viewpoint images sequentially, before detecting the blank area in each of the single-viewpoint images and filling the blank area, detecting and smoothing a sudden change area in the single-viewpoint image, before assembling the plurality of single-viewpoint images and forming a synthesized image, comprising specifically:

saving the single-viewpoint images sequentially, and numbering the single-viewpoint images as 1, 2, . . . , N viewpoint, while tagging the actual viewpoints, wherein N is a natural number;

detecting sequentially if other single-viewpoint images except for the actual view-point have any blank areas exist, if they have, then interpolating and filling the pixels, adopting four pixels in a non-blank area around the blank area and adjacent to the blank area, according to a certain proportion of distance;

detecting sequentially if other single-viewpoint images except for the actual viewpoint have any sudden change areas exist, if they have, extracting a plurality of tags for positions of the sudden change areas, and detecting if a same area or an adjacent area of the position in the actual viewpoint image has a same sudden change area exist, if it has, then the sudden change area in the single-viewpoint image checked is normal, otherwise, performing a noise-reduction and smoothing process;

based on an arrangement of a plurality of physical pixels of the naked-eye 3D display screen, staggering the pixels in N of the single-viewpoint images, before assembling the plurality of N of the single-viewpoint images into a synthesized image, corresponding to the physical pixels of the naked-eye 3D display screen one by one.

5. The display method according to claim 4, wherein after processing the synthesized image for outputting, converting the synthesized image into a plurality of logic electronic signals and sending to the naked-eye 3D display screen for displaying, comprising specifically:

after performing a process of a frame frequency conversion, a Gamma correction, a signal amplitude adjustment and a color gamut format conversion to the synthesized image, converting the synthesized image processed into a plurality of logic electronic signals, before sending to the naked-eye 3D display screen for displaying.

6. A display system for converting a two-dimensional image into a multi-viewpoint image, comprising:

an image layering module, applied to preprocessing a two-dimensional image to be processed, acquiring and tagging a target object within the two-dimensional image, calculating a depth value of the target object according to a frequency component of the target object, and generating a plurality of layered images on a basis of a magnitude of the depth value;

a single-viewpoint image output module, applied to viewing the plurality of layered images from a plurality of different preset viewpoint positions, and tagging a viewpoint image, adopting different interpolation algorithms to estimate a pixel in a blank area of a virtual viewpoint image on a basis of a difference between the depth values of the layered images and filling the blank area, removing a space between two layers of the layered images and forming a virtual viewpoint image, scaling the viewpoint image and generating a single-viewpoint image for output;

a synthesized image generating module, applied to saving and numbering the single-viewpoint images sequentially, detecting the blank area in each of the single-viewpoint images and filling the blank area, detecting and smoothing a sudden change area in the single-viewpoint image, and assembling the plurality of single-viewpoint images and generating a synthesized image;

a display module, applied to converting the synthesized image into a plurality of logic electronic signals and sending to the naked-eye 3D display screen for displaying after processing the synthesized image for outputting.

7. The display system according to claim 6, wherein the image layering module comprising specifically:

a tagging unit, applied to sharpening the two-dimensional image to be processed, searching and detecting a boundary and an outline of an target object in the two-dimensional image and recognizing the target object, dividing and acquiring the target object in the two-dimensional image, tagging the target object acquired;

a depth value calculation unit, applied to obtaining a gray component of each target object, Fourier transforming the gray component and getting a frequency component of each target object, and calculating the depth value of each target object according to the frequency component;

a layering unit, applied to layering the target object and generating the layered images, based on the depth value of each target object, according to a correspondence between the layer and the depth value, while the space between two layers are a difference between the depth values of the target object.

8. The display system according to claim 7, wherein the single-viewpoint image output module comprising specifically:

a viewpoint tagging unit, applied to viewing the layered images through the different preset viewpoint positions, and tagging respectively a position of an actual viewpoint and a position of the virtual viewpoint in the viewpoint images;

a virtual viewpoint acquiring unit, applied to acquiring the depth values of the target objects where the tagged virtual viewpoints locate, and based on the difference between the depth values of the target objects, performing an interpolation calculation by adopting different interpolation algorithms, obtaining and filling the pixels of each position of the blank area in the tagged virtual viewpoint according to a calculated result, removing the space between two layers in the layered image and forming the virtual viewpoint images;

an image output unit, applied to scaling both an actual viewpoint image and the virtual viewpoint image respectively to a preset scale before generating and outputting a single-viewpoint image accordingly.

9. The display system according to claim 8, wherein the synthesized image generating module comprising specifically:

an actual viewpoint tagging unit, applied to saving the single-viewpoint images sequentially, and numbering the single-viewpoint images as 1, 2, . . . , N viewpoint, while tagging the actual viewpoints, wherein N is a natural number;

a pixel interpolation unit, applied to detecting sequentially if other single-viewpoint images except for the actual view-point have any blank areas exist, if they have, then interpolating and filling the pixels, adopting four pixels in a non-blank area around the blank area and adjacent to the blank area, according to a certain proportion of distance;

a sudden change area processing unit, applied to detecting sequentially if other single-viewpoint images except for the actual viewpoint have any sudden change areas exist, if they have, extracting the tags for positions of the sudden change areas, and detecting if the same area or the adjacent area in the actual viewpoint image according to the same tags for positions has a same sudden change area exist, if it has, then the sudden change area in the single-viewpoint image checked is normal, otherwise, performing a noise-reduction and smoothing process;

a synthesized image generating unit, applied to staggering the pixels in N of the single-viewpoint images, based on an arrangement of the pixels of the naked-eye 3D display screen, and assembling the plurality of N of the single-viewpoint images into a synthesized image, corresponding to the physical pixels of the naked-eye 3D display screen one by one.

10. The display system according to claim 9, wherein the display module comprising specifically:

an image process and display unit, applied to performing a process of a frame frequency conversion, a Gamma correction, a signal amplitude adjustment and a color gamut format conversion to the synthesized image, converting the synthesized image processed into a plurality of logic electronic signals, and sending to the naked-eye 3D display screen for displaying.

* * * * *